United States Patent [19]

Ruddy et al.

[11] Patent Number: 4,729,866

[45] Date of Patent: Mar. 8, 1988

[54] HIGH FLUENCE NEUTRON DOSIMETRY METHOD

[75] Inventors: Francis H. Ruddy; Ezra P. Lippincott, both of Monroeville, Pa.

[73] Assignee: Westinghouse Electric Corp., Pittsburgh, Pa.

[21] Appl. No.: 928,150

[22] Filed: Nov. 7, 1986

[51] Int. Cl.$^4$ ................................................ G01T 3/00
[52] U.S. Cl. ...................... 376/153; 250/390; 376/154
[58] Field of Search ............... 376/159, 153, 154, 257; 250/390 B, 370 E, 390 F, 472.1, 390 R

[56] References Cited

U.S. PATENT DOCUMENTS 3,604,931  9/1971  Kastner et al. .................. 250/472.1
3,735,135  5/1973  Bredoux et al. ................. 250/472.1

FOREIGN PATENT DOCUMENTS 0141185  11/1979  Japan ............................. 250/390 R

OTHER PUBLICATIONS

Analytical Chemistry, vol 48, No. 14, Dec. 1976, pp. 2135-2139, Center et al.
The Review of Scientific Instruments, vol 41, No. 11, Nov. 1970, pp. 1539-1543.
Frank H. Ruddy et al., "Standardized Physics-Dosimetry for U.S. Pressure Vessel Cavity Surveillance Programs, " Fifth International, *ASTM-Euratom Symposium on Reactor Dosimetry*, Geesthacht, HEDL-SA-3095, Sep. 1984.

*Primary Examiner*—Harvey E. Behrend
*Attorney, Agent, or Firm*—D. C. Abeles

[57] ABSTRACT

A high fluence neutron dosimetry method is described, including the steps of: exposing a dosimeter containing an alpha-emitting target isotope to neutron irradiation to form an alpha-emitting product isotope; determining the alpha decay rates of the target nucleus and the product nucleus; and using known alpha decay constants for the target nucleus and the product nucleus and the determined alpha decay rates of the target nucleus and the product nucleus to determine the neutron capture rate of the product nucleus.

4 Claims, No Drawings

HIGH FLUENCE NEUTRON DOSIMETRY METHOD

BACKGROUND OF THE INVENTION

This invention relates to a method for monitoring neutron fluence and, more particularly, to a highly accurate method for measuring reaction rates induced by neutron exposure.

Federal government regulations require that nuclear reactor coolant pressure boundaries have sufficient margin to ensure that the boundary behaves in a non-brittle manner when stressed under operating, maintenance, testing and postulated accident conditions, and that the probability of rapidly propagating fracture is minimized. These requirements necessitate prediction of the amount of radiation damage to the reactor vessel throughout its service life, which in turn requires that the neutron exposure to the pressure vessel be monitored.

Methods currently used for such monitoring, known generally as high fluence neutron dosimetry, include helium accumulation fluence monitors, solid state track recorders, and radiometric monitors. In each of these methods, a neutron-induced reaction rate is measured. In the case of helium accumulation fluence monitors, integral (n, α) rates are measured by isotope dilution helium mass spectrometry. In the solid state track recorder method, neutron-induced integral fission rates are measured by counting fission tracks. In the case of radiometric monitors, neutron-induced reaction rates are measured by radiometric counting of activation products.

When these high fluence neutron dosimetry methods are applied at a nuclear power reactor, high measurement accuracy is a goal with 3-5% uncertainty or better being a general requirement. These conventional high fluence neutron dosimetry methods, however, have inherent accuracy limitations due to uncertainties in dosimeter mass and detection of product isotopes.

In light thereof, a simpler and more accurate high fluence neutron dosimetry method is needed for measuring neutron exposure within a nuclear power reactor.

SUMMARY OF THE INVENTION

Accordingly, it is an object of the present invention to provide a high fluence neutron dosimetry method which is simpler and is characterized by a much higher inherent accuracy than conventional methods.

It is another object of the present invention to provide a high fluence neutron dosimetry method whose only practical accuracy limitation is the counting statistics of the product isotope.

To achieve the foregoing and other objects of the present invention, and in accordance with the purposes of the invention, there is provided a high fluence neutron dosimetry method comprising the steps of: exposing a dosimeter containing an alpha emitting target isotope to neutron irradiation to form an alpha emitting product isotope; determining the alpha decay rates of the target nucleus and the product nucleus; and using the known alpha decay constants of the target nucleus and the product nucleus and the determined alpha decay rates of the target nucleus and the product nucleus to determine the neutron capture rate of the product nucleus.

The accuracy of the method according to the present invention is dependent only on the accuracy of counting statistics and decay constants. Errors usually associated with conventional methods, such as counting efficiency, geometry, dosimeter mass, self-absorption, scattering, etc. are completely eliminated.

DETAILED DESCRIPTION OF THE PREFERRED EMBODIMENTS

The preferred embodiments according to the present invention will now be described.

The capture of a neutron to produce a daughter nucleus is represented by the following general formula:

$$A + n \rightarrow (A+1), \tag{1}$$

where the target nucleus has a mass number A and the product nucleus has a mass number $A+1$. Assume that the target nucleus emits alpha radioactivity and that the product nucleus either emits alpha radiactivity directly or decays, to an alpha emitter. Then the neutron "capture rate" (indicated by "captures/atom") for the target nucleus A is represented by the following formula:

$$\text{Capture rate} = \frac{N_{A+1}}{N_A} \tag{2}$$

where $N_{A+1}$ is the number of atoms of the product nucleus formed in a neutron irradiation and $N_A$ is the number of atoms of the target nucleus. Since both are alpha active:

$$\lambda_A N_A = \text{alpha decay rate of } A = R_A \tag{3}$$

and $$\lambda_{A+1} N_{A+1} = \text{alpha decay rate of } A+1 = R_{A+1}, \tag{4}$$

where the quantities λ are alpha decay constants.

If a dosimeter containing atoms of target nucleus A is subjected to neutron irradiation, counted with an alpha spectrometer, and the alpha peaks for A and A+1 are separated by an alpha spectrometer, the following proportions necessarily obtain, with the same proportionality factor:

$$R_A \alpha \lambda_A N_A \tag{5}$$

and $$R_{A+1} \alpha \lambda_{A+1} N_{A+1} \tag{6}$$

These proportions accordingly can be relied on to determine the capture rate as follows:

$$\text{Capture rate} = \frac{N_{A+1}}{N_A} = \frac{R_A/\lambda_{A+1}}{R_A/\lambda_A} \tag{7}$$

$$= \frac{(R_{A+1})\lambda_A}{R_{A+1}(\lambda_{A+1})} \tag{8}$$

The only quantities required to calculate the capture rate are the alpha activities (R) and the decay constants (λ) of the target nucleus and the product nucleus. Decay constants for alpha emitters are generally known to better than 1%, as evidenced by the following Table 1.

TABLE 1
Decay Constants and Associated Uncertainties for Selected Alpha Emitters

| Nuclide | $t_{\frac{1}{2}}(y)$ | (sec$^{-1}$) | Uncertainty (%) |
|---|---|---|---|
| 230-Th | $(7.7 \pm 0.3) \times 10^4$ | $2.9 \times 10^{-13}$ | 3.9 |
| 232-Th | $(1.405 \pm 0.006) \times 10^{10}$ | $1.563 \times 10^{-18}$ | 0.43 |
| 233-U | $(1.592 \pm 0.020) \times 10^5$ | $1.380 \times 10^{-13}$ | 1.3 |
| 235-U | $(7.038 \pm 0.005) \times 10^8$ | $3.121 \times 10^{-17}$ | 0.071 |
| 238-U | $(4.468 \pm 0.003) \times 10^9$ | $4.916 \times 10^{-18}$ | 0.067 |
| 237-Np | $(2.14 \pm 0.01) \times 10^6$ | $1.026 \times 10^{-14}$ | 0.47 |
| 236-Pu | $2.851 \pm 0.008$ | $7.704 \times 10^{-9}$ | 0.28 |
| 238-Pu | $(8.774 \pm 0.004) \times 10^1$ | $2.503 \times 10^{-10}$ | 0.046 |
| 239-Pu | $(2.411 \pm 0.010) \times 10^4$ | $9.110 \times 10^{-13}$ | 0.41 |
| 240-Pu | $(6.537 \pm 0.010) \times 10^3$ | $3.360 \times 10^{-12}$ | 0.15 |
| 242-Pu | $(3.763 \pm 0.020) \times 10^5$ | $5.837 \times 10^{-14}$ | 0.53 |

Therefore, the limitation on accuracy of the capture rate measurement lies effectively only in the accuracy to which the two alpha decay rates (R) can be detected.

Generally, when a nuclear reaction is induced, the product nucleus is less stable than the target nucleus. In the case of alpha emission, this results in the product nucleus having a higher decay rate per atom than the target nucleus and also a higher alpha particle energy due to the well known Geiger-Nuttall Rule. Thus, although only a small number of capture reactions may be induced, the decay rate per atom will be higher, and the alpha energy will result in a peak higher than the target nucleus peak, both allowing the product nucleus to be detected more easily.

This effect has been observed in the recalibration of $^{237}$Np fission rate dosimeters used in SSTR fission rate measurements at a boiling water nuclear reactor. When subject to recalibrations, two $^{237}$Np dosimeters were found to have total alpha decay rates which were about 2% higher than before the neutron exposure. This increase was due to:

$$^{237}Np + n \longrightarrow ^{238}Np \tag{9}$$

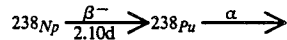
$$^{238}Np \xrightarrow[2.10d]{\beta^-} {}^{238}Pu \xrightarrow{\alpha} \tag{10}$$

The 2% increase in alpha activity was due to ingrowth of $^{238}$Pu. In the case of one of the dosimeters, analysis of alpha spectra resulted in the observation of 915 counts in the peak due to $^{238}$Pu(E$\alpha$=5.499 MeV) and 42,646 counts in the peak for $^{237}$Np(E$\alpha$=4.788 MeV). Since as shown in Table 1 the decay constants for $^{237}$Np and $^{238}$Pu are $1.026 \times 10^{-14}$ sec$^{-1}$ ($\pm 0.47\%$) and $2.503 \times 10^{-10}$ $\pm 0.046\%$), respectively the capture rate is determined as follows:

$$\text{Capture rate} = \frac{R_{238}\lambda_{237}}{R_{237}\lambda_{238}} \tag{11}$$

$$= \frac{(915)(1.026 \times 10^{-14})}{(42,646)(2.503 \times 10^{-10})} \tag{12}$$

$$= 8.79 \times 10^{-7} \text{ captures/atom} \tag{13}$$

Since the decay constant uncertainties are small, the overall uncertainty is determined mainly by the uncertainty of the number of counts of $^{238}$Pu (3.3%). Counting of the dosimeters for a longer time period resulting in the accumulation of more than 10,000 counts in the $^{238}$Pu peak will result in determination of the capture rate to an absolute uncertainty of better than 1%.

Several other reaction rate possibilities exist for other target/product pairs, as summarized by the following Table 2.

TABLE 2
Capture Reactions For High Fluence Neutron Dosimetry

| Target Isotope | Product Isotope | Target $\alpha$ Half Life | Product $\alpha$ Half Life | Capture Cross Section (barns) |
|---|---|---|---|---|
| $^{232}$Th | $^{233}$U | $1.40 \times 10^{10}$y | $1.59 \times 10^5$y | 74.85 |
| $^{235}$U | $^{236}$U | $7.04 \times 10^8$y | $2.34 \times 10^7$y | 98 |
| $^{231}$Pa | $^{232}$U | $3.28 \times 10^4$y | 72y | 210 |
| $^{238}$U | $^{239}$Pu | $4.67 \times 10^4$y | $2.41 \times 10^4$y | 27 |
| $^{237}$Np | $^{238}$Pu | $2.14 \times 10^6$y | 87.7y | 170 |
| $^{239}$Pu | $^{240}$Pu | $2.41 \times 10^4$y | $6.54 \times 10^3$y | 200 |
| $^{240}$Pu | $^{241}$Pu | $6.54 \times 10^3$y | 14.7y | 290 |
| $^{226}$Ra | $^{227}$Ac | 1600y | 21.8y | 110 |
| $^{241}$Am | $^{242}$Cm | 432y | 163d | 630 |
| $^{248}$Cm | $^{249}$Bk | $3.39 \times 10^5$y | 320d | 25 |
| $^{244}$Pu | $^{245}$Cm | $8.3 \times 10^7$y | $8.5 \times 10^3$y | 17 |
| $^{242}$Pu | $^{243}$Am | $3.76 \times 10^5$y | $7.38 \times 10^3$y | 190 |
| $^{247}$Bk | $^{248}$Cf | $1.4 \times 10^3$y | 334d | 100b |
| $^{252}$Cf | $^{253}$Es | 2.64y | 20.47y | 20 |

As can be seen, many different half life combinations exist, allowing dosimetry sets to be tailored to specific dosimetry applications (e.g., long duration/low fluence vs. high fluence/short duration). Thermal and epithermal reaction rates can be measured using cadmium covers. Table 2 is by no means an exhaustive list. That is, other non-capture reactions are contemplated by the present invention, such as (n,n'), (n,2n), (n,p) and (n,$\alpha$). One example would be:

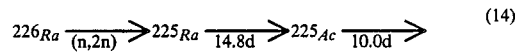
$$^{226}Ra \xrightarrow{(n,2n)} {}^{225}Ra \xrightarrow{14.8d} {}^{225}Ac \xrightarrow{10.0d} \tag{14}$$

These reactions are generally threshold reactions opening up the possibility of providing neutron spectrally sensitive reaction rates.

Production of thin alpha emitting deposits for these applications has already been accomplished (e.g., for solid state track recorder dosimetry) and alpha spectrometry methods are already routine.

There are several advantages to this method over the prior art methods described above:

1. Higher accuracy—uncertainty determined mainly by the alpha decay rate of the product nucleus $R_{A+1}$.
2. The dosimeter mass need not be known.
3. The counter efficiency need not be known.
4. The sample-counter geometry factor need not be known.
5. The method is ideal for high neutron fluence.

In addition, sample self-absorbtion or self-scattering may be rendered unimportant and dosimeter dose rates can be made small by using materials that have low neutron activation. These last two advantages can be realized by making a thin layer of target material (less than 100 $\mu$g/cm$^2$) on a substrate such as aluminum which will not activate during the neutron bombardment. For small deposit areas, the method is insensitive to uniformity of the deposit.

The foregoing is considered illustrative only of the principles of the invention. Further, since numerous modifications and changes will readily occur to those skilled in the art, it is not desired to limit the invention to the exact construction and operation shown and described. Accordingly, resort may be had to all suitable modifications and equivalents falling within the scope of the invention and the appended claims as would be understood within the art.

I claim:

1. A high fluence neutron dosimetry method, comprising the steps of:
   (a) exposing a dosimeter containing an alpha-emitting target isotope to neutron irradiation to form an alpha-emitting product isotope;
   (b) determining the alpha decay rates of the target nucleus and the product nucleus; and
   (c) using known alpha decay constants for the target nucleus and the product nucleus and the determined alpha decay rates of the target nucleus and the product nucleus to determine the neutron capture rate of the target nucleus.

2. The method as recited in claim 1, wherein step (b) comprises the following substeps:
   (i) subjecting the exposed dosimeter to a counting of the number of atoms of the target nucleus and the number of atoms of the product nucleus using an alpha-spectrometer, and
   (ii) separating the respective alpha peaks representing the decay rates of the target nucleus and the product nucleus using the alpha-spectrometer.

3. The method as recited in claim 1, wherein the target nucleus and the product nucleus are selected from the target/product isotope pairs $^{232}$Th-$^{233}$U, $^{235}$U-$^{236}$U, $^{231}$Pa-$^{232}$U, $^{238}$U-$^{239}$Pu, $^{237}$Np-$^{238}$Pu, $^{239}$Pu-$^{240}$Pu, $^{240}$Pu-$^{241}$Pu, $^{226}$Ra-$^{227}$Ac, $^{241}$Am-$^{242}$Cm, $^{248}$Cm-$^{249}$Bk, $^{244}$Pu-$^{245}$Cm, $^{242}$Pu-$^{243}$Am, $^{247}$Bk-$^{248}$Cf and $^{252}$Cf-$^{253}$Es.

4. The method as recited in claim 2, wherein the target nucleus and the product nucleus are selected from the target/product isotope pairs $^{232}$Th-$^{233}$U, $^{235}$U-$^{236}$U, $^{231}$Pa-$^{232}$U, $^{238}$U-$^{239}$Pu, $^{237}$Np-$^{238}$Pu, $^{239}$Pu-$^{240}$Pu, $^{240}$Pu-$^{241}$Pu, $^{226}$Ra-$^{227}$Ac, $^{241}$Am-$^{242}$Cm, $^{248}$Cm-$^{249}$Bk, $^{244}$Pu-$^{245}$Cm, $^{242}$Pu-$^{243}$Am, $^{247}$Bk-$^{248}$Cf and $^{252}$Cf-$^{253}$Es.

* * * * *